(12) United States Patent
Klein et al.

(10) Patent No.: US 12,264,758 B2
(45) Date of Patent: Apr. 1, 2025

(54) THREADED JOINT

(71) Applicant: Tenaris Connections B.V., Amsterdam (NL)

(72) Inventors: Federico Guillermo Klein, Buenos Aires (AR); Adam Hasskamp, Houston, TX (US)

(73) Assignee: Tenaris Connections B.V., Amsterdam (NL)

( * ) Notice: Subject to any disclaimer, the term of this patent is extended or adjusted under 35 U.S.C. 154(b) by 0 days.

(21) Appl. No.: 18/005,034

(22) PCT Filed: Jul. 13, 2021

(86) PCT No.: PCT/EP2021/069410
§ 371 (c)(1),
(2) Date: Jan. 10, 2023

(87) PCT Pub. No.: WO2022/013193
PCT Pub. Date: Jan. 20, 2022

(65) Prior Publication Data
US 2023/0250902 A1    Aug. 10, 2023

(30) Foreign Application Priority Data

Jul. 13, 2020 (EP) .................................... 20185444

(51) Int. Cl.
*F16L 15/06* (2006.01)
*F16L 15/00* (2006.01)
*E21B 17/042* (2006.01)

(52) U.S. Cl.
CPC ............ *F16L 15/06* (2013.01); *F16L 15/001* (2013.01); *E21B 17/042* (2013.01)

(58) Field of Classification Search
CPC ........ F16L 15/06; F16L 15/001; E21B 17/042
See application file for complete search history.

(56) References Cited

U.S. PATENT DOCUMENTS

| | | | | |
|---|---|---|---|---|
| 4,121,862 A | * | 10/1978 | Greer | ................ F16L 15/001 285/333 |
| 4,616,537 A | * | 10/1986 | Axford | ................ E21B 17/042 82/110 |
| 5,330,239 A | | 7/1994 | Blose et al. | |
| 7,347,459 B2 | * | 3/2008 | Geary | ................ E21B 17/042 285/333 |
| 10,473,241 B2 | * | 11/2019 | Inose | ................ F16L 15/06 |

(Continued)

FOREIGN PATENT DOCUMENTS

| | | |
|---|---|---|
| EP | 3473798 A1 | 4/2019 |
| JP | WO2019 111803 A1 | 6/2019 |

OTHER PUBLICATIONS

PCT International Search Report and Written Opinion for International Application No. PCT/EP2021/069410 dated Sep. 16, 2021.

*Primary Examiner* — David Bochna
(74) *Attorney, Agent, or Firm* — Knobbe, Martens, Olson & Bear, LLP (57) ABSTRACT

A tubular threaded joint for use in the oil and gas industry is described. The tubular threaded joint includes a first tubular member having a pin and a second tubular member having a box, wherein the pin is an end portion of the first tubular member and comprises on its radially outward-facing surface a male threaded zone comprising a tapered male thread.

25 Claims, 5 Drawing Sheets

(56) References Cited

U.S. PATENT DOCUMENTS

| | | | |
|---|---|---|---|
| 2004/0251686 A1* | 12/2004 | Otten | E21B 17/042 |
| | | | 285/333 |
| 2015/0316181 A1* | 11/2015 | Tejeda | F16L 15/06 |
| | | | 285/66 |
| 2018/0223606 A1* | 8/2018 | Rueda | F16L 15/06 |
| 2021/0254413 A1* | 8/2021 | Campbell | F16L 15/06 |
| 2023/0066104 A1* | 3/2023 | Ott | E21B 17/042 |

* cited by examiner

THREADED JOINT

INCORPORATION BY REFERENCE TO ANY PRIORITY APPLICATIONS

Any and all applications for which a foreign or domestic priority claim is identified in the Application Data Sheet or PCT Request as filed with the present application are hereby incorporated by reference under 37 CFR 1.57, and Rules 4.18 and 20.6. This application claims the benefit of International Patent App. No. PCT/EP2021/069410, filed Jul. 13, 2021, and European Patent App. No. EP 20185444.5, filed Jul. 13, 2020, each of which are incorporated by reference herein in their entirety for all purposes.

BACKGROUND

Tubular threaded joints are used to connect tubes in the oil and gas industry. As such, improvements to tubular threaded joints may be advantageous.

SUMMARY

According to the invention, there is provided a tubular threaded joint defined by claims 1 and/or 15.

BRIEF DESCRIPTION OF THE DRAWINGS

For a better understanding of the invention, and to show how the same may be put into effect, reference will now be made, by way of example only, to the accompanying drawings in which:

FIGS. 5a to 5i show alternative configurations falling within the scope of the invention.

DETAILED DESCRIPTION

The invention relates to a tubular threaded joint for use in the oil and gas industry. The joint comprises a first tubular member having a pin and a second tubular member having a box. The pin and box carry opposing tapered threads so that they may be made up by screwing the pin into the box. As the pin is screwed into the box, interference between the threads increases, resulting in an increase in the torque required for further screwing of the pin into the box. The particular threaded joint of the invention has features that can achieve at specific axial locations a lower level of torque for a corresponding amount of make up. Such a joint is particularly advantageous when, for example, the tubular members have thin walls relative to their diameter as is typical of large diameter tubes. Also, this can be of benefit when the equipment available at the site is limited in relation to the torque that can be applied.

A preferred embodiment provides a tubular threaded joint comprising a first tubular member having a pin and a second tubular member having a box.

The pin is an end portion of the first tubular member and comprises on its radially outward-facing surface a male threaded zone comprising a tapered male thread. The box is an end portion of the second tubular member and comprises on its radially inward-facing surface a female threaded zone comprising a tapered female thread. The male thread and female thread are configured to engage with each other when the joint is in a made-up state.

The pin has a terminal end, i.e. a free end. In particular, the terminal end of the pin is the end of the pin that is located at a distance from the first tubular member. In other words, the terminal end of the pin is the end that is situated away from the point of attachment with said first tubular member.

As is known in the art, a tapered thread is one which lies on a conical surface and so forms in three dimensions a spiral shape.

A made-up state is achieved when the tubular members are engaged so as to provide interference between the flanks of the threads. For example, in the case of a joint that utilises wedge threads, a made-up state is achieved when both opposing (load and stabbing) flanks interfere. In the case of a joint that utilises axially abutting torque shoulder surfaces, a made-up state is achieved when the torque shoulders are in abutment.

The male thread and female thread are each trapezoidal and comprise a crest, a root, a load flank, and a stabbing flank.

Preferably, on both of the male thread and the female thread at least one of the load flank and the stabbing flank is negatively inclined (i.e., both threads have negatively inclined load flanks and/or both threads have negatively inclined stabbing flanks). As is the convention in the art, a negatively inclined flank is one which tends to increase the width of the crest of the thread as compared with the base of the thread. When both flanks are positively inclined, the thread has a narrower crest than root in cross-section. When one flank is negatively inclined and one is positively inclined, the thread is a hooked thread. When both flanks are negatively inclined, the thread is dovetail shape in cross-section. Both hooked and dovetail threads are envisaged for the present invention.

A first portion of the male thread that extends to an end of the male thread has a first taper relative to a longitudinal axis of the first member. Similarly, a first portion of the female thread that extends to an end of the female thread has a second taper relative to a longitudinal axis of the second member. The longitudinal axis of the tubular member is, of course, the length direction of the tube (i.e., perpendicular to the radii of the tubular member).

The first portion of the male thread and the first portion of the female thread are configured to engage with each other when the joint is in the made-up state.

The second taper is different from the first taper. In this way, in the first portions the threads can converge towards the end of the threads. As the threads converge, the interference of the negatively inclined flanks, which are preferably the load flanks of the male and female threads, can be reduced in the first portion. In this way, the torque that must be carried by the wall of the tubular member can be reduced in the region defined by the first portion.

For example, the first portion of the male thread may be nearer the terminal end of the pin than the rest of the male thread. In which case, if the second taper is greater than the first taper such that the threads converge towards the terminal end of the pin, then the interference between the negatively inclined flanks can reduce towards the terminal end of the pin.

This can have benefit in a variety of contexts. For example, since the thread is tapered, the wall thickness may reduce towards the terminal end of the pin. The reduction in the interference between the negatively inclined flanks can reduce the torque carried in this narrowed portion of the first tubular member.

Moreover, in the example of a wedge thread (as described below), the male thread varies in width such that the crest decreases in width in the axial direction and is narrowest (i.e., in terms of width) at the terminal end of the pin. If the second taper is greater than the first taper such that the threads converge towards the terminal end of the pin, then the stress on the male thread caused by the engagement of the negative flanks will lessen as the thread narrows. Thus, the end of the male thread near the terminal end of the pin can be protected.

Also in the example of a wedge thread, the female thread varies in width and is narrowest (i.e., in terms of width) at the terminal end of the box. If the second taper is less than the first taper such that the threads converge towards the terminal end of the box, then the stress on the female thread caused by the engagement of the negative flanks will lessen as the thread narrows. Thus, the end of the female thread near the terminal end of the box can be protected.

In preferred embodiments, the joint comprises at least one sealing zone.

The pin comprises on its radially outward-facing surface a male sealing zone comprising a male sealing surface, and the box comprises on its radially inward-facing surface a female sealing zone comprising a female sealing surface. The male and female sealing surfaces are arranged to radially interfere with each other when the joint is in the made up state.

For the best possible performance of the seal, the interference between the two sealing surfaces must not be too small, since this would not provide a seal against a large pressure. However, the interference between the two sealing surfaces must not be too large, since this would lead to deformation (either plastic deformation or galling) of the surfaces and so reduce their performance over time.

When a sealing zone is provided, it is therefore preferred that the second taper is different from the first taper such that the threads converge towards the sealing zone. When a sealing zone is provided at the end of the pin, it is preferred that the second taper is greater than the first taper. When a sealing zone is provided at the terminal end of the box, it is preferred that the second taper is less than the first taper. That is, the interference between the negatively inclined flanks will reduce towards the sealing zone.

The higher the interference between the negatively inclined flanks, the more the threads are pulled radially towards each other as they are screwed together. Near the sealing zones, this could have the negative consequence of unduly increasing the interference of the sealing surfaces and causing unwanted deformation. However, with the taper of the threads configured in the manner described, the interference of the negatively inclined load and/or stabbing flanks (preferably, the load flanks) in the first portion is lessened near the sealing surface, and so the unwanted increase in interference between the sealing surfaces can be lessened and/or avoided.

As is known in the art, the sealing zones can be internal, external, provided between two portions or steps of the threads, or some combination of these options.

In some embodiments, an internal sealing zone is positioned between the threaded zone and the terminal end of the pin. When an internal sealing zone is provided, the first portion of the male thread may be nearer the terminal end of the pin than the rest of the male thread. The first portion of the female thread may be nearer the terminal end of the pin than the rest of the female thread. The second taper is greater than the first taper such that the threads converge towards the internal sealing zone.

In some embodiments, an external sealing zone is positioned between the threaded zone and the terminal end of the box. When an external sealing zone is provided, the first portion of the male thread may be nearer the terminal end of the box than the rest of the male thread. The first portion of the female thread may be nearer the terminal end of the box than the rest of the female thread. The second taper is greater than the first taper such that the threads converge towards the external sealing zone.

In some cases, the pin and box may each have two threaded zones, with the sealing zone axially therebetween. In those cases, it is preferred that the second taper is greater than the first taper in the first portion of a first of the threaded zones such that the threads converge towards the sealing zone. The first portion of the thread of the first threaded zone is nearer the sealing zone than the rest of that thread. Optionally, in the second of the threaded zones the threads may also converge towards the sealing zone (that is, in the opposite direction from the direction of convergence of the first portion). The first portion of the thread of the second threaded zone is nearer the sealing zone than the rest of that thread.

The invention has particular application when the threads of the threaded joint are wedge threads. With wedge threads, the male thread varies in axial width along its length such that it narrows towards the terminal end of the pin, and the female thread varies in axial width along its length such that it narrows towards the terminal end of the box.

When wedge threads are present both flanks of each thread will engage so as to interfere axially in addition to any radial interference present.

Typically, a wedge thread will achieve a higher torque than a non-wedge thread. In embodiments in which a wedge thread is used a torque shoulder may optionally be omitted, because the axial interference of the wedge threads can be used to increase the torque to a suitable level during make-up.

It is preferred that on both of the male thread and the female thread the load flank and the stabbing flank are both negatively inclined. That is, the preferable thread form for both male and female threads is a so-called dovetail shape.

A dovetail thread shape is conventionally used for a wedge thread connection, and would be the preferred thread form for any embodiments having a wedge thread.

In a joint having dovetail-shaped wedge threads significant interference can occur between the threads because both load and stabbing flanks are negatively inclined and interference is present in the axial direction as well as in the radial direction. When such a thread terminates near to sealing surfaces, an unwanted increase in interference between those sealing surfaces can result. The invention is therefore particularly advantageous in such a situation, since the interference in the threads may be lessened near the sealing surfaces by the tapering of the threads in the first portions next to the sealing zone (by "next to" is meant closer to the sealing zone than the remainder of the respective thread). A further advantage is that galling resulting from flank to flank contact can be reduced.

Large diameter pipes generally have walls that are thin relative to their diameter. Accordingly, they can have the disadvantage of deforming or collapsing under high torques, in particular in the tapered sections of the pin and the box. The torque reducing effect of the invention is therefore particularly applicable for such pipes. These may be characterised as pipes having an outer diameter of the box member of at least 18 inches. Alternatively, or in addition, these may be characterised as pipes for which the outer diameter of the pipe having a pin member divided by the thickness of the pipe body (D/t) is at least 25 (the thickness of the pipe body is measured away from a pin or a box, for example, the thickness at the mid-point of the pipe).

The discussion of thread taper above relates to a first portion of each of the male and female threads. The first portions extend to ends of the threads. The first portion may be the whole thread. However, that need not be the case. It is not necessary for the difference in tapers to extend along the entirety of the threads. In fact, it is preferable that the threads comprise at least first and second portions, wherein the difference in tapers exists in the first portions and the threads have matching tapers in the second portions.

Specifically, in preferable embodiments, a portion of the male thread extending to the first portion of the male thread is a second portion of the male thread. A portion of the female thread corresponding to the second portion of the male thread is a second portion of the female thread. The second portion of the male thread has the same taper as the second portion of the female thread.

To achieve a difference in taper between the first portions of the male and female threads, but matching taper in the second portions of the male and female threads, it is preferable that the male thread has a constant taper along its length, but the taper of the female thread changes. That is, the first portion of the male thread has the same taper as the second portion of the male thread, but the first portion of the female thread has a different taper from the second portion of the female thread. Optionally, the first and second portions of either thread collectively form at least 75% of the axial length of that thread, preferably 100%.

Less preferably, the female thread has a constant taper along its length, but the taper of the male thread changes. That is, the first portion of the female thread has the same taper as the second portion of the female thread, but the first portion of the male thread has a different taper from the second portion of the male thread.

The reason that it is preferred to have a constant taper along the male thread is that if the taper of the female thread is increased, this will provide a higher critical section in the box, improving the efficiency of the connection (the efficiency of a connection is the ratio of the smallest critical section of the threads to the pipe body cross-section and limits the performance of the connection).

Although the convergence of the threads lessens the interference between the negatively inclined flanks of the threads, in cases where the root of one thread and crest of the opposing thread interfere, the convergence of the threads can undesirably increase that crest to root interference.

In the case where a first of the threads (i.e., one of the male and female threads) has a crest that interferes with the root of the second thread (i.e., the other of the male and female threads), the first thread comprises a complete portion and an incomplete portion.

In the complete portion, the height of the first thread is constant. In the complete portion the crest of the first thread contacts the root of the second thread.

In contrast, the incomplete portion is formed such that the height of the first thread is less than the height of the thread in the complete portion.

In particular, the incomplete portion may be configured such that, when the pin and the box are made up, the roots of one of the male and female threads are located at a distance from the crests of the other of the male and female threads.

For example, the incomplete portion may be machined or otherwise cut to reduce the height of the thread to thereby reduce the interference of the crest and the opposing root. In the incomplete portion, there may be a clearance between the crest of the first thread and the root of the second thread, although this is not essential. However, it is preferable that the flanks of the incomplete portion of the first thread engages the flanks of the second thread over its full length.

When the crest of the first thread contacts the root of the second thread in the complete portion, a clearance is preferably provided in both the complete and incomplete portions between the root of the first thread and the crest of the second thread.

As will be described below, the crest of the incomplete portion of the first thread may define a cylindrical surface, or defines a conical surface, or the crest of the incomplete portion of the female thread defines a cylindrical surface extending to a conical surface, with the conical surface nearest the end of the first thread.

As shown below, the incomplete portion may be some or all of the first portion. In this way, the first portion can provide a region of convergence between the threads, for example towards a sealing zone. Any unwanted increase in crest to root interference that results from the convergence of the threads may be lessened and/or avoided by the reduced height of the thread (the height of the thread for which the crest interferes with the opposing root).

Whereas the thread may be reduced in height to define a cylindrical surface, the taper of some threads may be such that this would result in too high a reduction in the area of contact of the stabbing flanks of the turns of the thread in the incomplete portion. Accordingly, additionally or instead, the threads may be reduced in height to define a conical surface.

In a preferred sealing zone configuration, applicable to any embodiment, one of the male sealing surface and the female sealing surface is a rounded surface, and the other of the male sealing surface and the female sealing surface is a conical surface. Any deformation of the pin or box in the sealing zone can therefore result in a pivoting action around the rounded sealing surface and so the sealing effect can be maintained even when there is some deformation. This is particularly important in a large diameter pipe, which will have a relatively thin wall, which can deform by a greater amount.

As can be seen from FIGS. 1 to 4, a first embodiment of a threaded joint comprises a pin 100 formed on the end of a first tubular member 1 and a box 200 formed on the end of a second tubular member 2.

Although the invention is applicable to tubular members of a variety of sizes, the outer diameter of the box member 200 is preferably at least 18 inches. Alternatively, or in addition, these may be characterised as pipes for which the outer diameter of the pipe having a pin member divided by the thickness of the pipe body (D/t) is at least 25 (the thickness of the pipe body is measured away from a pin or a box, for example, the thickness at the mid-point of the pipe).

Figure 1:
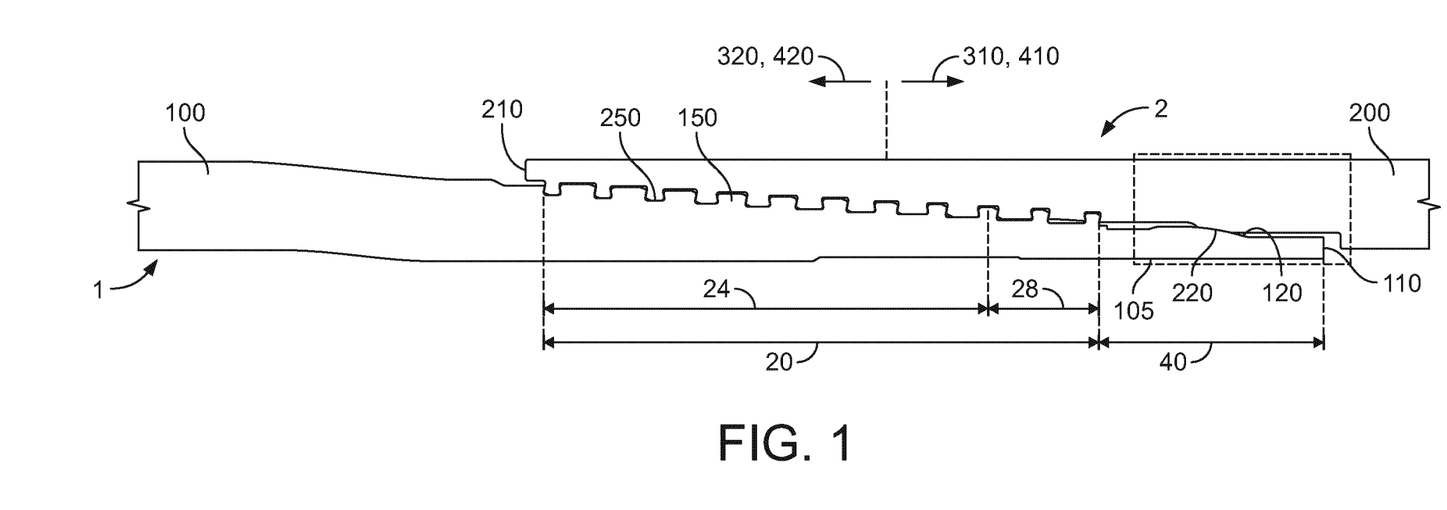
FIG. 1 shows half of a cross-section of an embodiment of a threaded joint in accordance with the invention.

The pin 100 is preferably formed on a swaged end of the first tubular member 1. Advantageously, this enables the thickness of the pin 100 at a sealing zone 40 to be greater. This can provide extra material for machining the seal and so provide structural capacity in the critical section.

The internal diameter of the first tubular member 1 is preferably bored.

Each of the pin 100 and box 200 have formed thereon a threaded zone 20 and sealing zone 40. The threaded zone 20 extends up to the sealing zone 40. The sealing zone 40 extends from the threaded zone 20 to the terminal end of the pin 110

The pin 100 comprises a tapered male thread 150 on its radially outward-facing surface in the threaded zone 20. The box 200 comprises a tapered female thread 250 on its radially inward-facing surface in the threaded zone 20.

The male thread 150 and female thread 250 are configured to engage with each other. In this way, the pin 100 may be screwed into the box 200 to align the threaded zones 20 and sealing zones 40.

The threaded zone 20 comprises a complete portion 24 in which both the threads 150, 250 have a consistent height (e.g., from crest to root) and an incomplete portion 28 in which at least one of the threads 150, 250 has a thread height that is smaller than the thread height in the complete portion 24.

Figure 3:
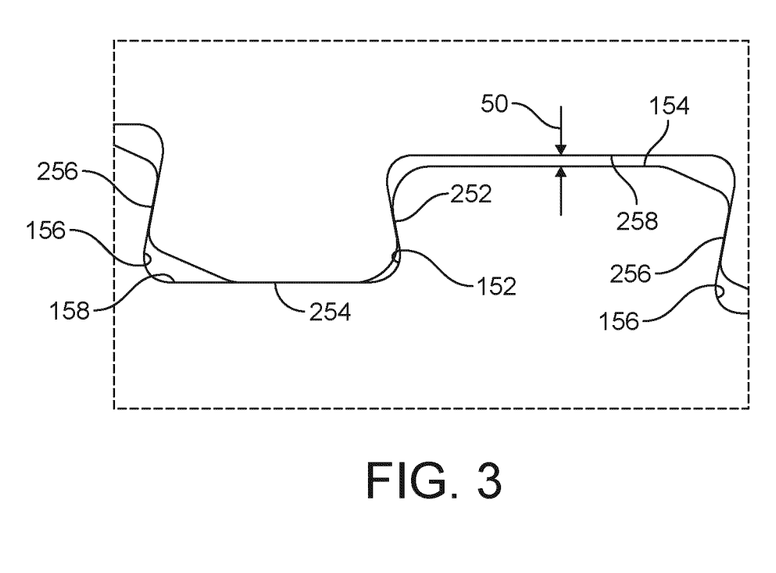
FIG. 3 shows a close-up view of a complete portion of the thread of the threaded joint of FIG. 1.

A section of the complete portion of the threaded zone 24 can be seen in FIG. 3. In the complete portion 24, each thread 150, 250 includes a load flank 152, 252, a stabbing flank 156, 256, a crest 154, 254, and a root 158, 258. The threads can be referred to as trapezoidal threads. As is known in the art, the profile of the threads 150, 250 may include rounded and/or chamfered corners whilst still being referred to as trapezoidal.

More particularly, the threads 150, 250 are preferably formed as dovetail threads. This means that the load flanks 152, 252 and the stabbing flanks 156, 256 on both threads 150, 250 are negatively inclined. The negative inclination of the flanks of the threads 150, 250 result in a thread shape that has an axial width that is greater at the crest 154, 254 than the base of the thread.

In the complete portion 24, the crest 254 of the female thread 250 contacts the root 158 of the male thread 150 and a clearance 50 is provided between the root 258 of the female thread 250 and the crest of the male thread 150. The clearance 50 may be in the range 0.004 to 0.016 inches, preferably 0.008 inches.

The male thread 150 and female thread 250 are configured as so-called wedge threads. That is, the male thread 150 varies in axial width along its length such that it narrows towards the terminal end 110 of the pin 100, and the female thread 250 varies in axial width along its length such that it narrows towards the terminal end of the box 210. The pitch of each thread is constant so that the axial spacing between subsequent turns of each thread is greater where the thread is narrower. Put another way, for each thread, the pitch of the load flank is a first constant value and the pitch of the stabbing flank is second constant value, different from the first.

As the pin 100 is screwed into the box 200, initially, with only a small axial overlap, the threads 150, 250 pass easily through the spaces between turns of the opposing thread. As the pin 100 is screwed further into the box 200, and the threads 150, 250 overlap by a larger amount, the thread axial widths and axial spacings become increasingly similar until there is engagement between both load flank and stabbing flanks of both threads 150, 250. Any further screwing action at that point leads to axial interference between the threads 150, 250, greatly increasing the torque required to screw the pin 100 further into the box 200.

Since the wedge threads 150, 250 provided a mechanism for increasing torque sharply on make-up, it is preferred to not provide a torque shoulder on the pin 100 that contacts a corresponding torque shoulder on the box 200.

Figure 2:
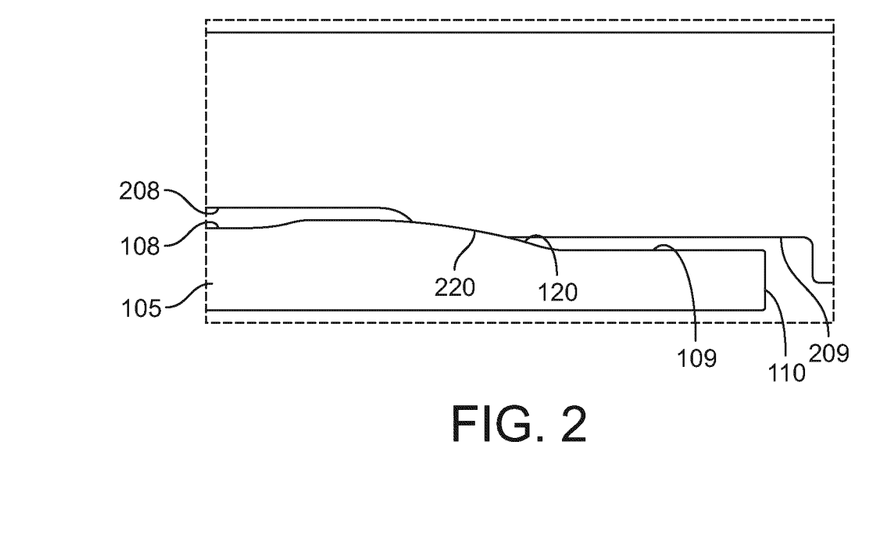
FIG. 2 shows a close-up view of a sealing zone of the threaded joint of FIG. 1.

The pin 100 comprises on its radially outward-facing surface a male sealing zone 40, shown in more detail in FIG. 2. The male sealing zone 40 extends from the threaded zone 20 to the terminal end of the pin 110.

The male sealing zone 40 may define a nose 105 of the pin 100. The male sealing zone 40 comprises a male sealing surface 120 on its radially outward-facing surface. The female sealing zone 40 opposes the male sealing zone 40 when the joint is in the made-up state. The female sealing zone 40 of the box 200 comprises on its radially inward-facing surface a female sealing surface 220. The male and female sealing surfaces 120, 220 are arranged to radially interfere with each other when the joint is in the made up state.

The male and female sealing surfaces 120, 220, may take any shape that enables a seal to be formed by interference. However, it is preferable that the male sealing surface 120 is a rounded surface, and the female sealing surface 220 is a conical surface (although the other way around is possible).

The conical surface preferably has an angle of 5 to 15 degrees from the longitudinal axis of the female tubular member 2, more preferably the angle is 7 to 12 degrees, most preferably 9 degrees.

In preferred embodiments, in the sealing zone 40, the pin surfaces 108 and 109 located axially either side of the male sealing surface 120 are radially spaced from the box surfaces 208 and 209 located axially either side of the female sealing surface 220. In this way, a gap is formed between the pin 100 and box 200 either side of the radially interfering male and female sealing surfaces 120, 220. Most preferably, the male surface 108 extends to the end of the male thread 150, and the female surface 208 extends to the end of the female thread 250.

In the first embodiment, the male and female threads, although complementary, do not have identical tapers.

A first portion 310 of the male thread 150 has a first taper A relative to a longitudinal axis of the first member 1, and a first portion 410 of the female thread 250 has a second taper B relative to a longitudinal axis of the second member 2. The second taper B is greater than the first taper A so that the threads converge towards the sealing zone 40. This can lessen the engagement of the negative flanks 152, 156, 252, 256 towards the sealing zone 40. The first portion 310 of the male thread 150 and the first portion 410 of the female thread 250 are configured to engage with each other when the joint is in the made-up state.

Optionally, the entire male thread 150 has a first taper A relative to a longitudinal axis of the first member 1, and the entire female thread 250 has a second taper B relative to a longitudinal axis of the second member 2. However, it is preferred that the male thread 150 includes a second portion 320 and the female thread 250 includes a second portion 420, and the second portions 320, 420 of the male and female threads 150, 250 both have the same taper. Preferably, both the threads 150, 250 have a taper equal to the first taper A in the second portion 320, 420. In this way, the first portions 310, 410 of the threads 150, 250 have parallel tapers and the second portions 320, 420 of the threads 150, 250 have converging tapers.

In the preferred embodiment shown in FIGS. 1 to 4, the first portion 310 of the male thread 150 is nearer the terminal end 110 of the pin 100 than the second portion 310 of the male thread 150. The second portion 420 of the female thread 250 is nearer the terminal end 210 of the box 200 than the first portion of the female thread 150

Preferably, the difference in taper between the male and female threads 150, 250 in the first portion 310, 410 is in the range 0.002 to 0.006 inches per revolution, most preferably 0.004 inches per revolution.

Preferably, the axial length of the first portion 310, 410 is at least 2 inches, preferably at least 3 inches.

For example, the first taper may be in the range 0.038 to 0.042 inches per revolution, and the second taper may be in the range 0.040 to 0.044 inches per revolution.

As mentioned above, the threaded zone 20 comprises a complete portion 24 and an incomplete portion 28. The female thread 250 comprises a distal end nearest the terminal end 210 of the box 200 and a proximal end opposite the distal end. In the embodiment of FIGS. 1 to 4, the incomplete portion is at the proximal end of the female thread 250.

In the incomplete portion 28, at least one of the threads 150, 250 has a thread height that is smaller than the thread height in the complete portion 24. In the embodiment depicted in FIGS. 1 to 4, the male thread height is consistent along the full thread except for an optional runout at the terminal end of the thread. A runout is a gradual reduction in the height of a thread down to zero. The runout at the end of the thread preferably does not engage the opposing thread. In contrast, the female thread height is consistent in the complete portion 24, but is reduced in the incomplete portion 28.

Figure 4:
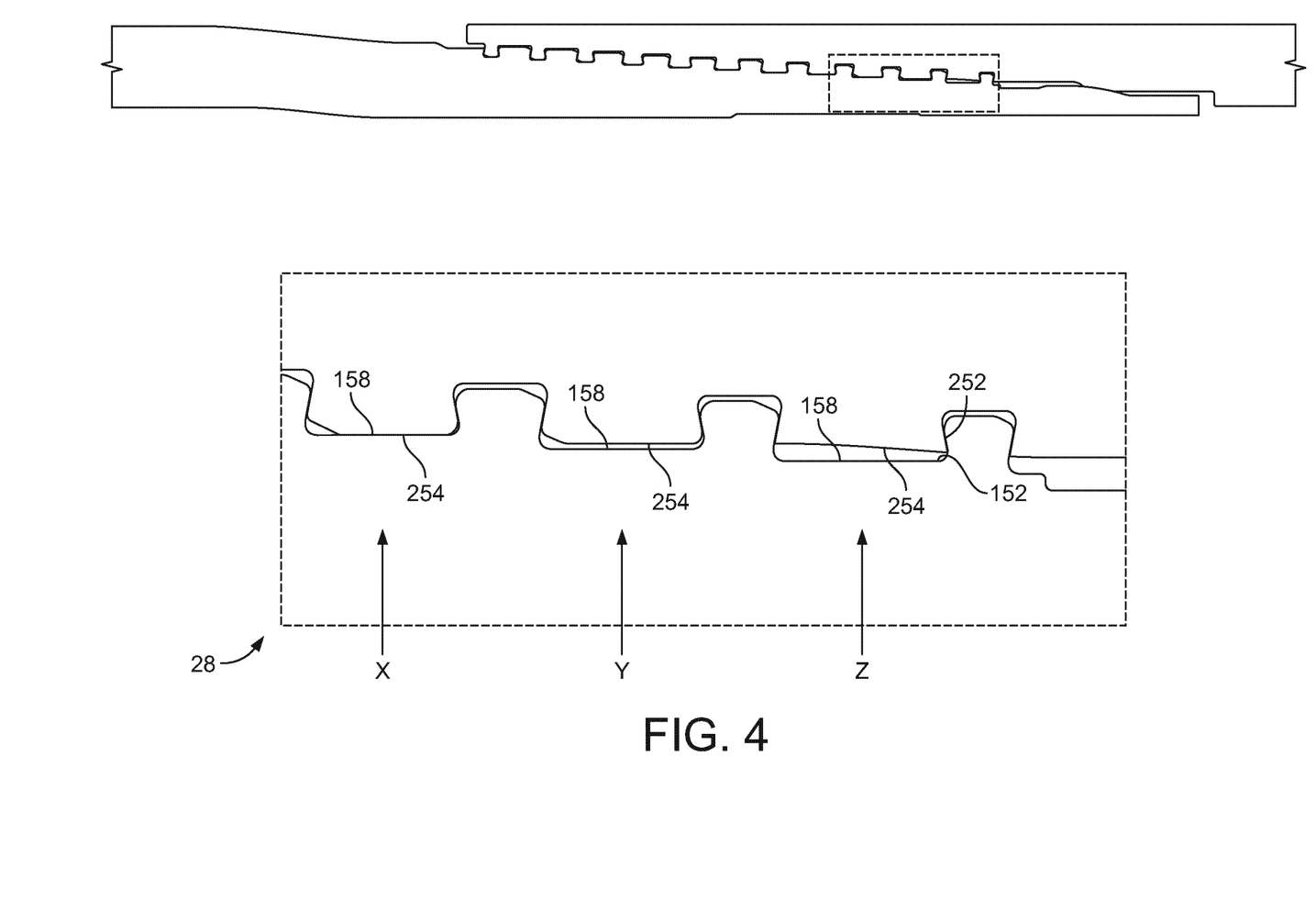
FIG. 4 shows a close-up view of an incomplete portion of the thread of the threaded joint of FIG. 1.

In other words, the female thread 250 has a first height in the complete portion 24, and no more than a second height in the incomplete portion 28. The second height is less than the first height. In some embodiments, at least one flank of the incomplete portion 28 contacts the opposing flank along its full length.

Preferably, the incomplete portion has an axial length of at least 0.5 inches, preferably at least 1.2 inches.

Since the threads 150, 250 have a converging taper, which reduces flank interference by an increasing amount towards the sealing zone 40, the interference between crest 254 of the female thread 250 and the root 158 of the male thread 150 would increase towards the sealing zone 40 if the height of the female thread 250 were maintained in that region. By providing the incomplete portion 28, it is possible to avoid the increase in interference that would result from the converging threads. Preferably, in the incomplete portion 28, the crests 254 of the female thread 250 is spaced from the root 158 of the male thread 150.

There are many ways to form the incomplete portion 28. However, a simple machining operation may be used to simply cut the female thread 250 such that the crest 254 in the incomplete portion 28 defines a cylindrical surface. That is, the crest 254 may have a constant radius in the incomplete portion.

Another simple machining operation may be used to simply cut the female thread 250 such that the crest 254 in the incomplete portion 28 defines a conical surface. That is, the crest 254 may define a surface that tapers linearly in the axial direction in the incomplete portion.

In some embodiments, the cylindrical and conical approaches may be combined. Preferably, the crest 254 of the female thread 250 in the incomplete portion 28 defines a surface formed of a cylindrical surface extending axially to a conical surface, with the cylindrical surface nearest the proximal end of the female thread 250.

Moreover, multiple cylindrical and conical portions may be provided depending on the requirements of the threaded joint.

With reference to FIG. 4, there can be seen a cross-section through the threaded joint in the incomplete portion 28. In this figure, three turns of the female thread are shown as X, Y, and Z.

The height of the female thread 250 in turn X may be less than the height of the female thread 250 in the complete portion 24. The crest 254 of the female thread 250 still contacts the root 158 of the male thread 150. However, the interference between the crest 254 of the female thread 250 and the root 158 of the male thread 150 for turn X in the incomplete portion 28 is less than the interference between the crest 254 of the female thread 250 and the root 158 of the male thread 150 for any turn of the complete portion 24.

The height of the female thread 250 in turn Y is less than the height of the female thread 250 in the complete portion 24. Here, a clearance exists between the crest 254 of the female thread 250 and the root 158 of the male thread 150.

Preferably, the crests of turns X and Y both are part of the cylindrical surface and so have the same thread height on the female thread 250. However, turn X is in interference with the opposing male root, while turn Y is not, owing to the taper of the male root.

As can be seen from turn Z, if the cylindrical surface defined by the crest 254 of turns X and Y of the female thread 250 were to continue for another turn, then the area of contact between the stabbing flank 252 of turn Z and the opposing stabbing flank 152 of the male thread 150 would be relatively small. Therefore, instead of continuing the cylindrical surface, a conical surface is used. Thus, by having a conical surface, it is possible to obtain crest-to-root clearance, while still providing adequate flank-to-flank contact.

That is, the crest 254 of the female thread 250 in turn Z is less than the height of the female thread 250 in the complete portion 24 and includes a conical surface. Here, a clearance exists between the crest 254 of the female thread 250 and the root 158 of the male thread 150.

FIG. 4 shows a turn Z having the end of the cylindrical surface and the start of the conical surface. However, there may be turns of the female thread 250 (at the proximal end of the female thread 250) for which the crest 254 is purely conical.

In the embodiment depicted in FIG. 4, the male thread height is consistent along the full thread except for the incomplete portion at the terminal end of the thread. A conical surface in the incomplete portion may can remove the need for a runout at the end of the thread. However, a runout may be provided if preferred. If only a cylindrical surface is provided (i.e. a conical surface is not provided), then a runout may be used. In either case, the runout preferably does not engage the opposing thread. When a runout is provided, the threads preferably engage throughout the regions having the cylindrical and conical surfaces (that is, the incomplete portion is preferably an incomplete engaging portion).

FIGS. 1 to 4 show one specific embodiment. In that embodiment, a preferred combination of options is depicted. The invention is not so limited. A specific thread form, the dovetail thread, is used, whereas in fact it is only necessary that one thread flank is negatively inclined. Moreover, the embodiment includes threads 150, 250 that converge towards the terminal end 110 of the pin 100, where a sealing zone 40 is located, in which the male thread 150 has a taper that is constant throughout the first 310 and second 320 portions, while the female thread 250 has a taper that is larger in the first portion 410 than in the second portion 420. Moreover, the female thread crests 254 interfere with the male thread roots 158.

It is not essential to include a sealing zone 40, but if one is provided it may be on the internal side or external side of the threads 150, 250 (see below). When a sealing zone 40 is provided, it is preferred that the threads 150, 250 converge towards the sealing zone 40.

A sealing zone 40 may be provided in between two steps of a two-step thread. In which case one or both of the steps of thread may converge towards the sealing zone 40.

It is not essential that the crest 254 of the female thread 250 contacts the root 158 of the male thread 150. The converse is possible. However, when the crest 254 of the female thread 250 contacts the root 158 of the male thread 150 in the complete portion 24, it is the crest 254 of the female thread 250 that has a smaller height in the incomplete portion 28 to form the cylindrical and/or conical surface. Similarly, in embodiments in which the crest 154 of the male thread 150 contacts the root 258 of the female thread 250 in the complete portion 24, it is the crest 154 of the male thread 150 that has a smaller height in the incomplete portion 28 to form the cylindrical and/or conical surface.

FIGS. 5a to 5i show a non-exhaustive selection of alternative, preferred, configurations of a threaded joint in accordance with the invention. These threaded joints each include male and female threads having at least one negatively inclined flank (load flank or stabbing flank). The threads are tapered with a taper angle A or B relative to the longitudinal axis of the respective member. Taper B is greater than taper A.

Figure 5A:
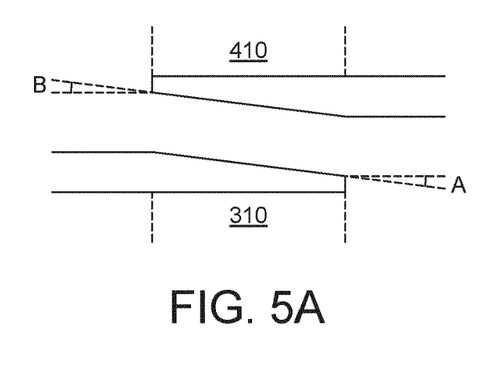

In FIG. 5a, there is no sealing zone. The entire female thread has a taper B greater than a taper A of the entire male thread.

Figure 5B:
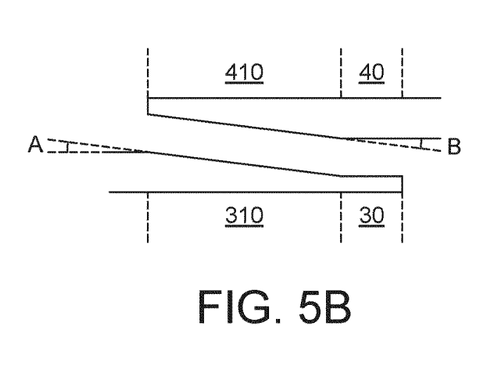

In FIG. 5b, there is a sealing zone 40 on the end of the pin. The entire female thread has a taper B greater than a taper A of the entire male thread so that the threads converge towards the sealing zone 40.

Figure 5C:
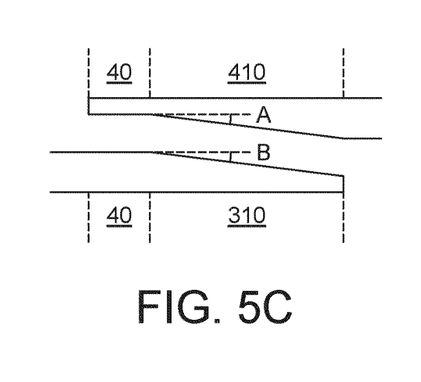

In FIG. 5c, there is a sealing zone 40 on the end of the box. The entire male thread has a taper B greater than a taper A of the entire female thread so that the threads converge towards the sealing zone 40.

Figure 5D:
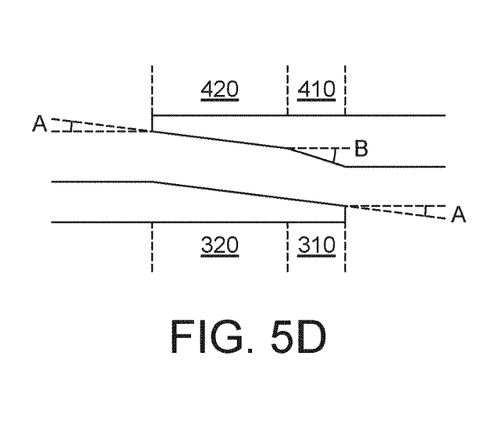

In FIG. 5d, there is no sealing zone. The first portion 410 of the female thread has a taper B greater than a taper A of the entire male thread (in both the first portion 310 and the second portion 320). The second portion 420 of the female thread has a taper A equal to that of the male thread.

Figure 5E:
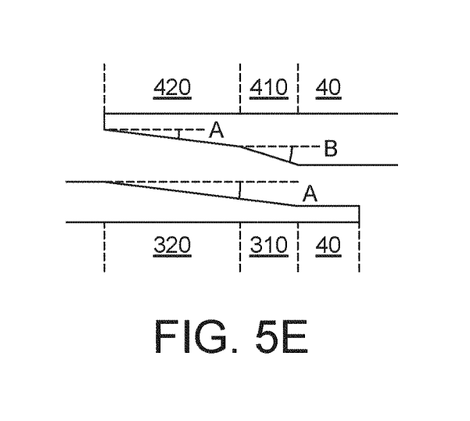

In FIG. 5e, there is a sealing zone 40 on the end of the pin. The first portion 410 of the female thread has a taper B greater than a taper A of the entire male thread (in both the first portion 310 and the second portion 320) so that the threads converge towards the sealing zone 40. The first portion 310 is closer to the sealing zone than the second portion 320. The second portion 420 of the female thread has a taper A equal to that of the male thread.

Figure 5F:
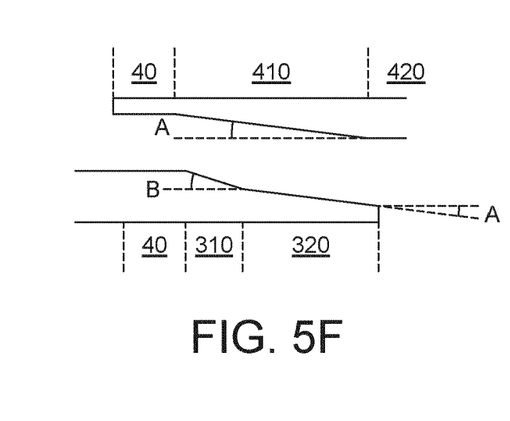

In FIG. 5f, there is a sealing zone 40 on the end of the box. The first portion 310 of the male thread has a taper B greater than a taper A of the entire female thread (in both the first portion 410 and the second portion 420) so that the threads converge towards the sealing zone 40. The first portion 410 is closer to the sealing zone than the second portion 420. The second portion 320 of the male thread has a taper A equal to that of the female thread.

Figure 5G:
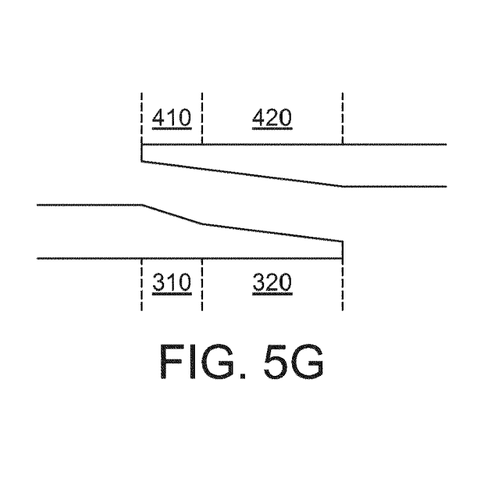

In FIG. 5g, there is no sealing zone. The first portion of the female thread has a taper B greater than a taper A of the entire male thread. The second portion of the female thread has a taper A equal to that of the male thread.

Figure 5H:
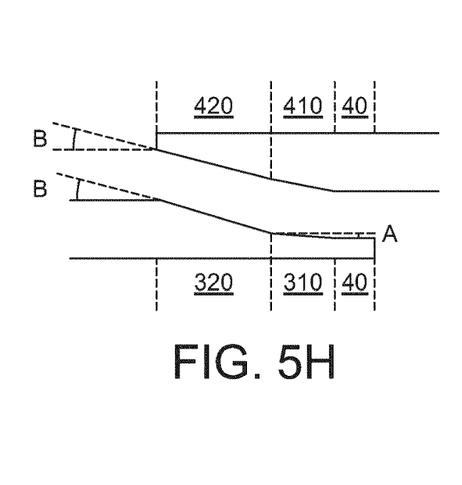
Figure 5I:
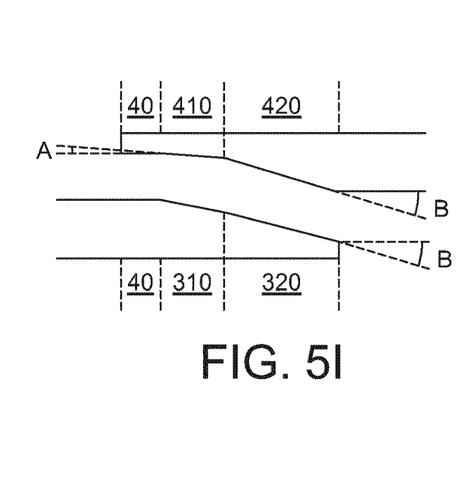

In FIGS. 5h and 5i, the member (pin or box) that carries the sealing zone at its terminal end has a thread with two different tapered portions. In these cases, the taper of the thread on the member that carries the seal is lower in the portion proximal the sealing zone than in the distal portion.

In FIG. 5h, there is a sealing zone 40 on the end of the pin. The first portion 310 of the male thread has a taper A less than a taper B of the entire female thread (in both the first portion 410 and the second portion 420) so that the threads converge towards the sealing zone 40. The first portion 310 is closer to the sealing zone 40 than the second portion 320. The second portion 320 of the male thread has a taper B equal to that of the female thread.

In FIG. 5i, there is a sealing zone 40 on the end of the box. The first portion 410 of the female thread has a taper A less than a taper B of the entire male thread (in both the first portion 310 and the second portion 320) so that the threads converge towards the sealing zone 40. The first portion 410 is closer to the sealing zone 40 than the second portion 420. The second portion 420 of the female thread has a taper B equal to that of the male thread.

As described above, the crest of the incomplete portion 28 of the first thread may define a cylindrical surface, or defines a conical surface, or the crest of the incomplete portion of the female thread defines a cylindrical surface extending to a conical surface, with the conical surface nearest the end of the first thread. These options are shown in FIG. 6.

Figure 6A:
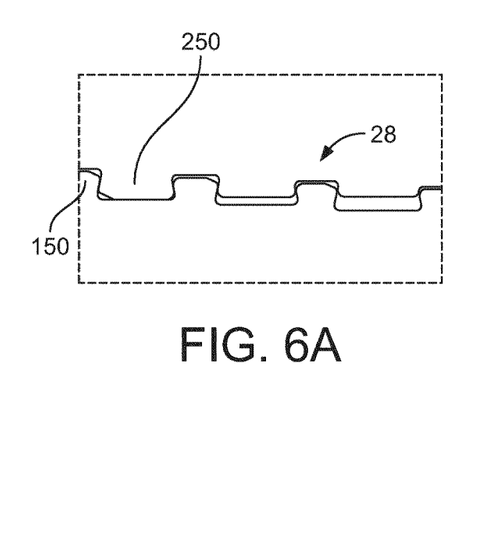
FIG. 6 shows optional configurations of conical and cylindrical crests.

In FIG. 6A, there can be seen an incomplete portion formed of a cylindrical surface.

Figure 6B:
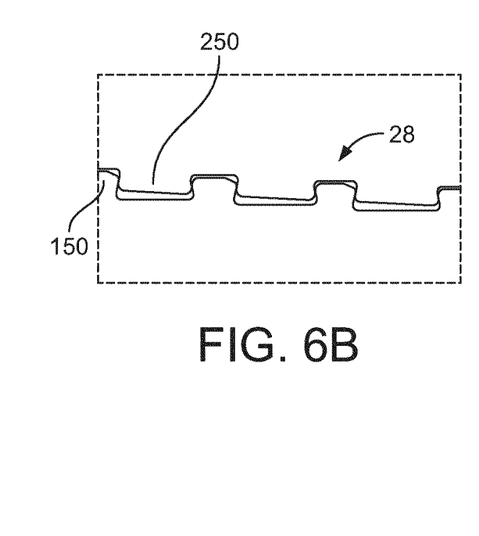

In FIG. 6B, there can be seen an incomplete portion formed of a conical surface.

Figure 6C:
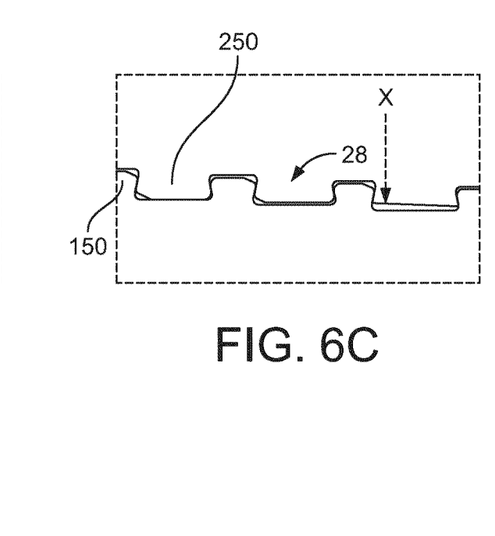

In FIG. 6C, there can be seen an incomplete portion formed of a cylindrical surface followed by a conical surface, with the two surfaces meeting at the axial location denoted by X.

The invention claimed is:

1. A tubular threaded joint comprising: a first tubular member comprising a pin, and a second tubular member comprising a box, wherein:
   the pin is an end portion of the first tubular member comprising a radially outward-facing surface, and the radially outward-facing surface comprises a male threaded zone comprising a tapered male thread;
   the box is an end portion of the second tubular member comprising a radially inward-facing surface, and the radially inward-facing surface comprises a female threaded zone comprising a tapered female thread;
   the male thread and female thread are configured to engage with each other when the joint is in a made-up state;
   the male thread and female thread are each trapezoidal and comprise a crest, a root, a load flank, and a stabbing flank;
   on each of the male thread and the female thread at least one of the load flank and the stabbing flank is negatively inclined;
   a first portion of the male thread extending from an end thereof comprises a first taper relative to a longitudinal axis of the first tubular member;
   a first portion of the female thread extending from an end thereof comprises a second taper relative to a longitudinal axis of the second tubular member, the first portion of the male thread and the first portion of the female thread are configured to engage with each other when the joint is in the made-up state;

the second taper is different from the first taper such that the threads converge toward an end of the threads in the made-up state;

the female thread comprises a distal end nearest a terminal end of the box and a proximal end opposite the distal end;

the female thread comprises a complete portion and an incomplete portion, the incomplete portion being at the proximal end of the female thread; and the crest of the incomplete portion of the female thread defines a surface selected from the group consisting of a cylindrical surface, a conical surface, and a cylindrical surface extending to a conical surface, wherein the conical surface is nearest the proximal end of the female thread.

2. The tubular thread of claim 1, wherein the first portion of the male thread is nearer to a terminal end of the pin than the rest of the male thread.

3. The tubular thread of claim 1, wherein:
the radially outward-facing surface of the pin comprises a male sealing zone comprising a male sealing surface;
the radially inward-facing surface of the box comprises a female sealing zone comprising a female sealing surface;
the male and female sealing surfaces are arranged to radially interfere with each other in the made-up state; and
the second taper is different from the first taper such that the threads converge towards the sealing zone in the made-up state.

4. The tubular thread of claim 3, wherein:
the male sealing zone is positioned between the male thread and a terminal end of the pin.

5. The tubular thread of claim 4, wherein the complete portion comprises the crest of the female thread contacting the root of the male thread and a clearance exists between the root of the female thread and the crest of the male thread.

6. The tubular thread of claim 3, wherein:
one of the male sealing surface and the female sealing surface is a rounded surface; and
the other of the male sealing surface and the female sealing surface is a conical surface.

7. The tubular thread of claim 3, wherein:
the female sealing zone is positioned between the female thread and a terminal end of the box;
the male thread comprises a distal end nearest a terminal end of the pin and a proximal end opposite the distal end;
the male thread comprises a complete portion and an incomplete portion, the incomplete portion being at the proximal end of the male thread; and
the crest of the incomplete portion of the male thread defines a surface selected from the group consisting of a cylindrical surface, a conical surface, and a cylindrical surface extending to a conical surface, wherein the conical surface is nearest the proximal end of the male thread.

8. The tubular thread of claim 7, wherein the complete portion comprises the crest of the male thread contacting the root of the female thread and a clearance exists between the root of the male thread and the crest of the female thread.

9. The tubular thread of claim 7, wherein the incomplete portion contacts the complete portion and a runout is provided at the end of the incomplete portion, and the runout does not engage the male thread.

10. The tubular thread of claim 1, wherein:
the male thread varies in axial width along its length such that it narrows towards a terminal end of the pin; and
the female thread varies in axial width along its length such that it narrows towards the terminal end of the box.

11. The tubular thread of claim 1, wherein on each of the male thread and the female thread, the load flank and the stabbing flank are each negatively inclined.

12. The tubular thread of claim 1, wherein an outer diameter of the second tubular member is at least 18 inches.

13. The tubular thread of claim 1, wherein:
a portion of the male thread extending to the first portion of the male thread is a second portion of the male thread;
a portion of the female thread corresponding to the second portion of the male thread is a second portion of the female thread; and
the second portion of the male thread comprises the same taper as the second portion of the female thread.

14. The tubular thread of claim 1, wherein the first portion of the male thread comprises the same taper as the second portion of the male thread.

15. A tubular threaded joint comprising: a first tubular member comprising a pin, and a second tubular member comprising a box, wherein:

the pin is an end portion of the first tubular member comprising a radially outward-facing surface, and the radially outward-facing surface comprises a male threaded zone comprising a tapered male thread;

the box is an end portion of the second tubular member comprising a radially inward-facing surface, and the radially inward-facing surface comprises a female threaded zone comprising a tapered female thread;

the male thread and female thread are configured to engage with each other when the joint is in a made-up state;

the male thread and female thread are each trapezoidal and comprise a crest, a root, a load flank, and a stabbing flank;

on each of the male thread and the female thread at least one of the load flank and the stabbing flank is negatively inclined;

a first portion of the male thread extending from an end thereof comprises a first taper relative to a longitudinal axis of the first tubular member;

a first portion of the female thread extending from an end thereof comprises a second taper relative to a longitudinal axis of the second tubular member, the first portion of the male thread and the first portion of the female thread are configured to engage with each other when the joint is in the made-up state;

the second taper is different from the first taper such that the threads converge toward an end of the threads in the made-up state;

the male thread comprises a distal end nearest a terminal end of the pin and a proximal end opposite the distal end;

the male thread comprises a complete portion and an incomplete portion, the incomplete portion being at the proximal end of the male thread; and the crest of the incomplete portion of the male thread defines a surface selected from the group consisting of a cylindrical surface, a conical surface, and a cylindrical surface extending to a conical surface, wherein the conical surface is nearest the proximal end of the male thread.

16. The tubular thread of claim 15, wherein:
the radially outward-facing surface of the pin comprises a male sealing zone comprising a male sealing surface;
the radially inward-facing surface of the box comprises a female sealing zone comprising a female sealing surface;
the male and female sealing surfaces are arranged to radially interfere with each other in the made-up state; and
the second taper is different from the first taper such that the threads converge towards the sealing zone in the made-up state.

17. The tubular thread of claim 16, wherein:
the female sealing zone is positioned between the female thread and a terminal end of the box.

18. The tubular thread of claim 16, wherein the complete portion comprises the crest of the male thread contacting the root of the female thread and a clearance exists between the root of the male thread and the crest of the female thread.

19. The tubular thread of claim 16, wherein the incomplete portion contacts the complete portion and a runout is provided at the end of the incomplete portion, and the runout does not engage the male thread.

20. The tubular thread of claim 16, wherein:
one of the male sealing surface and the female sealing surface is a rounded surface; and
the other of the male sealing surface and the female sealing surface is a conical surface.

21. The tubular thread of claim 15, wherein:
the male thread varies in axial width along its length such that it narrows towards a terminal end of the pin; and
the female thread varies in axial width along its length such that it narrows towards the terminal end of the box.

22. The tubular thread of claim 15, wherein on each of the male thread and the female thread, the load flank and the stabbing flank are each negatively inclined.

23. The tubular thread of claim 15, wherein an outer diameter of the second tubular member is at least 18 inches.

24. The tubular thread of claim 15, wherein:
a portion of the male thread extending to the first portion of the male thread is a second portion of the male thread;
a portion of the female thread corresponding to the second portion of the male thread is a second portion of the female thread; and
the second portion of the male thread comprises the same taper as the second portion of the female thread.

25. The tubular thread of claim 15, wherein the first portion of the male thread comprises the same taper as the second portion of the male thread.

* * * * *